United States Patent
Vading

(10) Patent No.: US 11,982,337 B2
(45) Date of Patent: May 14, 2024

(54) TRANSMISSION

(71) Applicant: Polygear AS, Oslo (NO)

(72) Inventor: Kjell Vading, Bodø (NO)

(73) Assignee: Polygear AS, Oslo (NO)

(*) Notice: Subject to any disclaimer, the term of this patent is extended or adjusted under 35 U.S.C. 154(b) by 316 days.

(21) Appl. No.: 17/424,631

(22) PCT Filed: Jan. 31, 2020

(86) PCT No.: PCT/NO2020/050022
§ 371 (c)(1),
(2) Date: Jul. 21, 2021

(87) PCT Pub. No.: WO2020/159383
PCT Pub. Date: Aug. 6, 2020

(65) Prior Publication Data
US 2022/0082155 A1 Mar. 17, 2022

(30) Foreign Application Priority Data
Jan. 31, 2019 (NO) .................................. 20190132

(51) Int. Cl.
*F16H 1/32* (2006.01)
*F16H 3/46* (2006.01)
(52) U.S. Cl.
CPC ................. *F16H 1/32* (2013.01); *F16H 3/46* (2013.01)
(58) Field of Classification Search
CPC ..................................... F16H 1/32; F16H 3/46
USPC .......................................................... 74/640
See application file for complete search history.

(56) References Cited

U.S. PATENT DOCUMENTS

| | | | |
|---|---|---|---|
| 7,437,975 B1* | 10/2008 | De Anfrasio | B25B 13/06 81/125 |
| 9,732,802 B2* | 8/2017 | Griffiths | F04D 29/263 |
| 2002/0168222 A1* | 11/2002 | Simons | F16D 1/101 403/359.1 |

(Continued)

FOREIGN PATENT DOCUMENTS

| | | |
|---|---|---|
| EP | 2495468 A2 | 9/2012 |
| WO | WO-2006015648 A1 | 2/2006 |
| WO | WO-2018044342 A1 | 3/2018 |

OTHER PUBLICATIONS

Frydenlund, Joachim; International Search Report; PCT/NO2020/050022; dated Apr. 17, 2020; 3 pages.

(Continued)

*Primary Examiner* — Ha Dinh Ho
(74) *Attorney, Agent, or Firm* — Bradley Arant Boult Cummings LLP

(57) ABSTRACT

A transmission comprising at least one rim 1 and at least one wheel 2. An outside surface of the wheel 2 is adapted to engage with an inside surface of the rim 1. The wheel 2 is rotatable about a first axis B and the rim 2 is rotatable about a second axis A. The second axis A is at a distance from the first axis B. The inside surface of the rim 1 has a cyclic polygonal shape with an angle between each adjoining side 4 of the polygon being greater than 90°. The outer surface of the wheel 2 has a cyclic polygonal shape with an angle between each adjoining side 6 of the polygon being greater than 90°. Each side 6 of the wheel 2 engaging with a side 4 of the rim 1 of equal length during rotation of said transmission.

8 Claims, 7 Drawing Sheets

(56) References Cited

U.S. PATENT DOCUMENTS

2003/0053887 A1\* 3/2003 Brooks ................ B23C 5/2462
411/403
2012/0279813 A1\* 11/2012 Kochsiek .............. F16D 65/123
188/71.1

OTHER PUBLICATIONS

Dorić, Jovan, et al.; "One Approach for Modelling Intermittent Motion Mechanism With Noncircular Gears"; Machine Design, vol. 3, No. 2; ISSN 1821-1259; Jan. 2011; pp. 121-126.

\* cited by examiner

TRANSMISSION

TECHNICAL FIELD

The present invention relates to a transmission comprising at least one rim and at least one wheel, an outside surface of said wheel being adapted to engage with an inside surface of said rim, said wheel being rotatable about a first axis and said rim being rotatable about a second axis, said second axis being at a distance from said first axis, according to the preamble of claim 1.

BACKGROUND ART

There are many types of transmissions known in the art, ranging from simple two gear transmissions where the two gears have different diameters, through epicyclic gearing and Derailleur gears to belt gears.

The known transmission systems are in general depending on either friction or teeth to transfer torque. Friction based transmission can usually only transfer torque up to a certain level. When the torque increases the tendency for the gear to slip increases due to the friction being overcome.

Toothed gears can transfer higher torques but suffer under the drawback that the teeth are subjected to a large force on a small area of each tooth. Consequently, the teeth will be subjected to extensive wear, especially if the tolerances are poor. Helical teething of the gears will reduce the wear, but the teeth are still subjected to high tensions.

As a consequence, the teeth and hence the gears have to be made large to be able to withstand the high tensions. This results in a bulky transmission system.

Fluid couplings are viable alternatives to a mechanical transmission. However, these also have drawbacks, such as loss in efficiency due to slip and a maximum stall speed.

SUMMARY OF INVENTION

The present invention aims at transferring torques mechanically without the use of teeth and without being dependent on friction. This is achieved by a transmission in which said inside surface of said rim has a cyclic polygonal shape with an angle between each adjoining side of said polygon being greater than 90°, and said outer surface of said wheel having a cyclic polygonal shape with an angle between each adjoining side of said polygon being greater than 90°; each side of said wheel engaging with a side of said rim of equal length during rotation of said transmission In one embodiment, the sides of said wheel are planar.

In an alternative embodiment, the sides of said wheel are slightly curved with a radius greater than 10 times the diameter of the wheel. This will provide a smoother rotation, especially for a wheel with few sides.

Preferably, the curvature is convex.

In a preferred embodiment, the sides of said rim are planar, which makes it easier to manufacture.

In a further embodiment, the transmission comprises at least two wheels arranged on a common shaft, said wheels having an angular displacement relative to each other; and at least two rims, one engaging each wheel, said rims having the same angular displacement relative to each other as the wheels. This allows for transfer of a greater torque and a smoother rotation.

In an even further embodiment, the wheel is displaceable transverse to the first rotation axis in order to disengage from said rim. This provides for a simple decoupling of the transmission.

In an even further embodiment, it comprises at least two wheels having different number of sides, said wheels being capable of being brought into engagement with the same rim, or different rims, to change the ratio of the transmission. This provides for different transmission ratios of the transmission.

BRIEF DESCRIPTION OF DRAWINGS

The invention will now be described with reference to the enclosed drawings, showing exemplary embodiments.

DETAILED DESCRIPTION OF THE INVENTION

Figure 1:
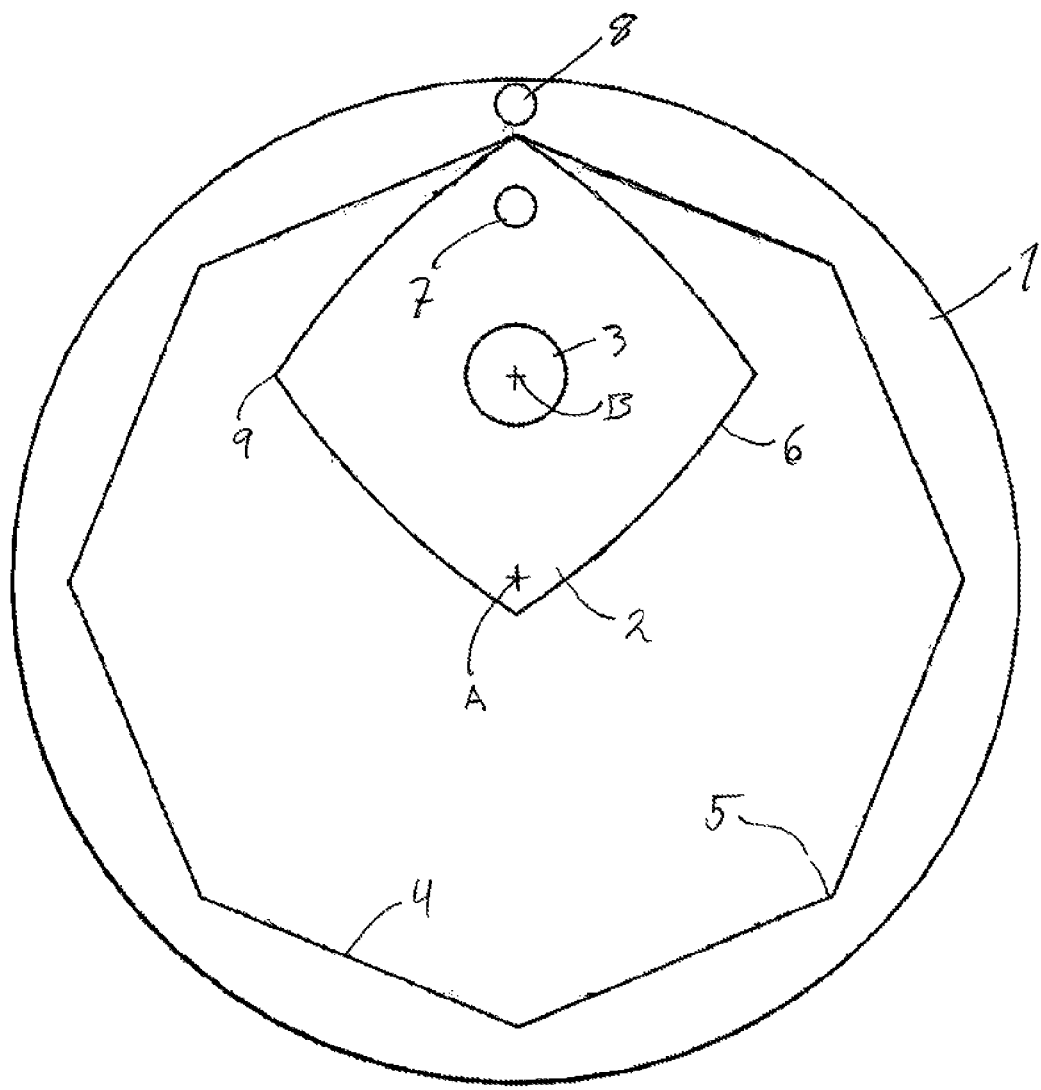
FIG. 1 shows a schematic cross-section of the transmission according to the invention in a first embodiment.

FIG. 1 shows schematically a cross-section of a first simple embodiment of the transmission of the invention. In its basic implementation, the transmission comprises two main components: a rim 1 and a wheel 2. The rim 1 is coupled to a shaft (not shown) and is mounted to revolve about an axis A. The wheel 2 is also coupled to a shaft 3 and is rotatable about an axis B.

The rim 1 has a polygonal shape at its inside. In the embodiment of FIG. 1, the inside of the rim 1 is an octagon with equal sides 4. The sides may be planar, as shown in FIG. 1, but may also be slightly curved, both concave and convex. Preferably, the corners 5 where the sides 4 meet, are slightly rounded.

The wheel is in this embodiment quadrilateral and each side 6 is slightly convex. The corners 9 between the sides 6 may be slightly rounded.

If the sides 4 of the rim 1 inside are slightly concave, the radius of the concave sides 4 will be larger than the radius of the convex sides 6 of the wheel 2.

If the sides 4 of the rim 1 inside are convex, the sides of the wheel may be slightly concave, but curved with a larger radius than the sides 4 of the rim 1 inside.

The sides 6 of the wheel 2 may also be planar, but then it is preferred that the sides 4 of the inside of the rim 1 are convex. If both the sides 6 of the wheel 2 and the sides 4 of the rim 1 inside are planar, the transmission may make more noise, but will nevertheless function well with regards to transmission of torque.

The small circle 7 on the wheel 2 and the corresponding small circle 8 on the rim are not features of the wheel 2 or rim1, but marks that will be used in the drawings to show how far the wheel 2 and rim 1 have rotated.

The function of the first embodiment of the invention will now be explained, referring to FIGS. 2-9, which show the rotation of the transmission in sequence. The rotational directions is in the direction of the arrows, i.e. both the wheel 2 and the rim 1 rotate in the same direction.

Figure 2:
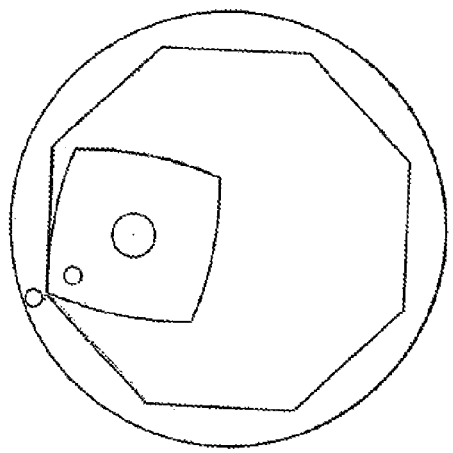
FIGS. 2-9 show a sequence illustrating the principle of operation of the first embodiment of the invention.

In FIG. 2 the wheel 2 and rim 1 are in the same position as in FIG. 1. The marks 7 and 8 are on top. In this position the corners 5 and 9 of the rim and wheel, respectively, are coinciding.

Figure 3:
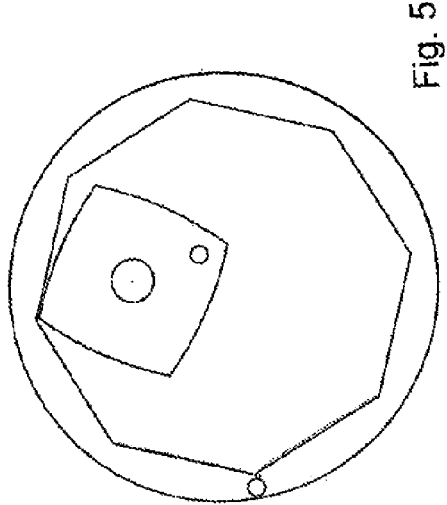

In FIG. 3 the wheel and rim have rotated a small angle. As can be seen, one side 6 of the wheel is about to meet one side 4 of the rim. As the side 6 of the wheel is slightly curved, the side 6 of the wheel will roll along the side 4 of the rim. It is preferred that the radius of the curved side 6 of the wheel is large so that the two sides 4, 6 have a large contact area.

The corner 9 of the wheel 2 will be lifted out of the corner 5 of the rim 1 when the contact area between the sides 4 and 6 are almost halfway between the adjacent corners 5.

Figure 4:
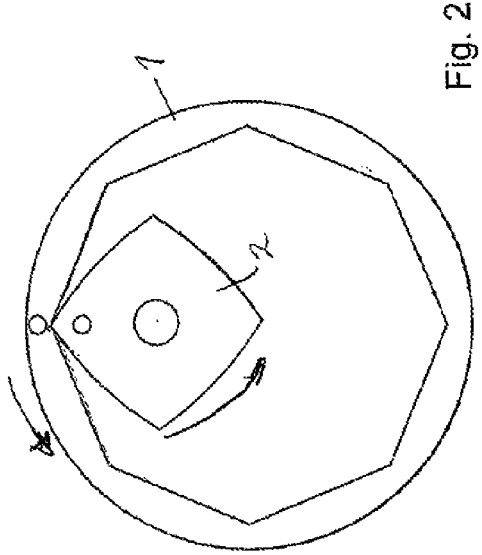

Shortly after the contact area between the sides 4 and 6 have passed the midpoint between the adjacent corners 5, the next corner 9 of the wheel 2 will coincide with the next corner 5 of the rim 1, as shown in FIG. 4.

Figure 5:
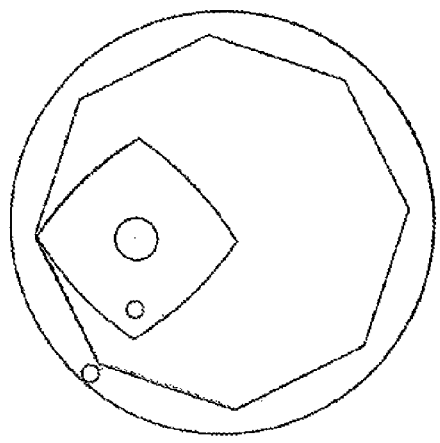

Then, as shown in FIG. 5, the next corner 9 of the wheel 2 will "tip" about the next corner 5 of the rim 1.

Figure 6:
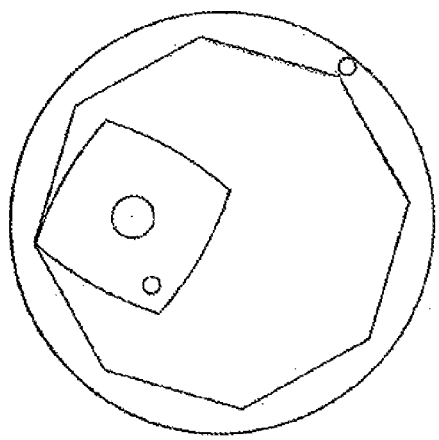

As shown in FIG. 6, when the wheel 2 has rotated one full rotation, the rim has revolved half a rotation.

Figure 7:
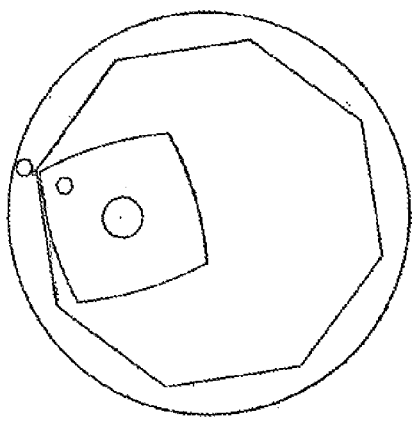
Figure 8:
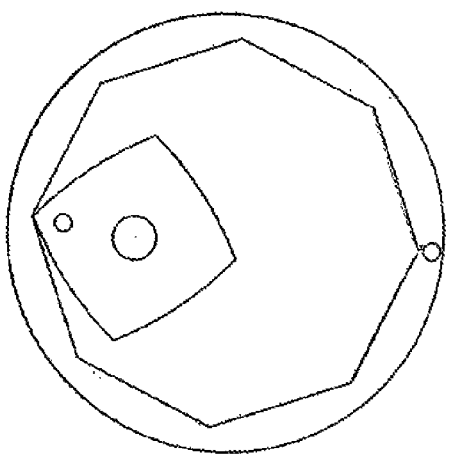
Figure 9:
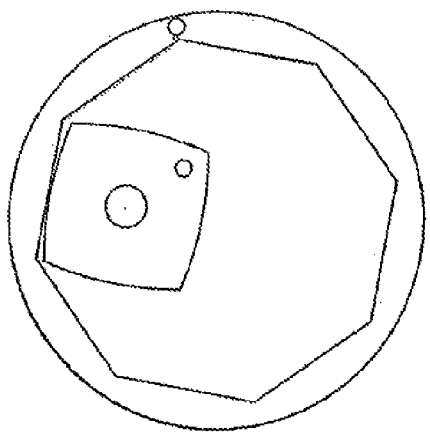
Figure 11:
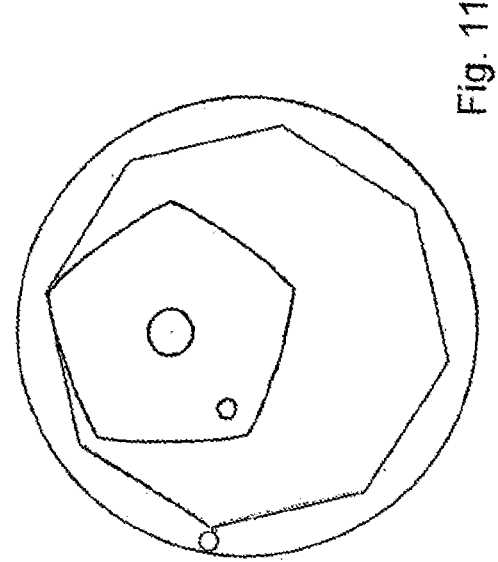
FIGS. 10-15 show a sequence illustrating the principle of operation of a second embodiment of the invention.
Figure 13:
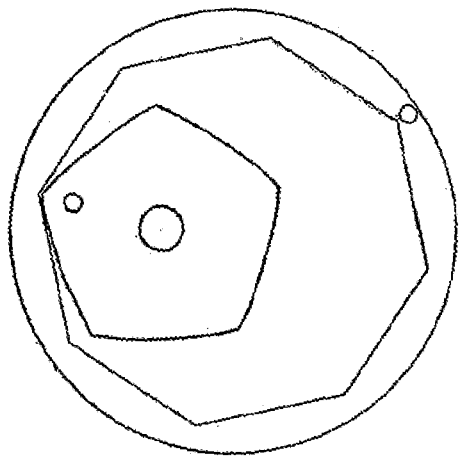
Figure 10:
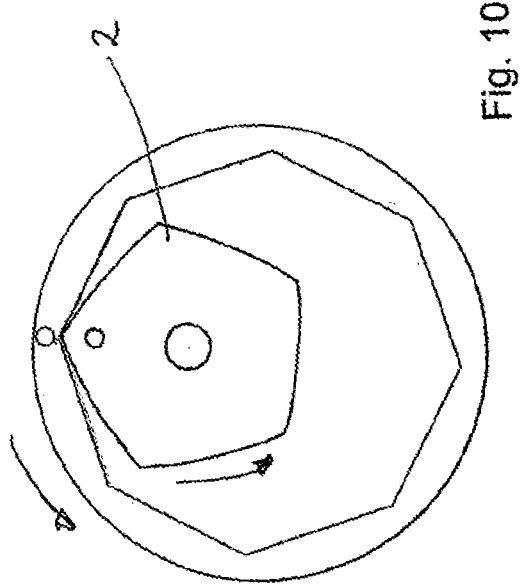
Figure 12:
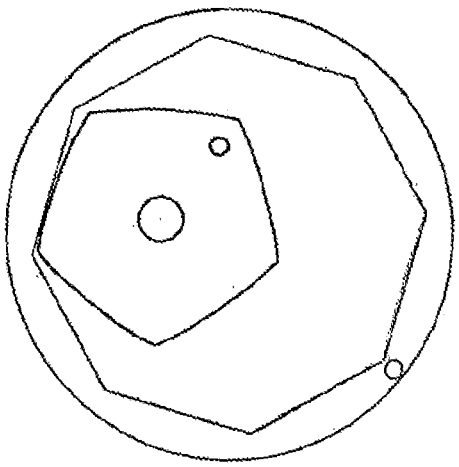

The rotation then continues through the situations in FIGS. 7 and 8 until it reaches a full rotation of the rim 1 and two rotations of the wheel 2. FIG. 9 shows the situation just before this.

Consequently, this embodiment of the invention has a transmission ratio of 1:2 or 2:1, depending on which shaft is used as input shaft and output shaft.

The driven shaft can be either the shaft of the wheel 2 or the shaft of the rim 1, depending on the application of the transmission.

FIG. 10-13 shows similar sequential snapshots of the rotation of a transmission as in FIGS. 3-9, but with a pentagonal wheel 2. The rotation direction is also here counterclockwise.

The pentagonal wheel 2 has also slightly convex sides 6, which are adapted to roll over the planar sides 4 of the rim 1, and the corners 9 of the when 2 will tip about the corners 5 of the rim 1.

Figure 15:
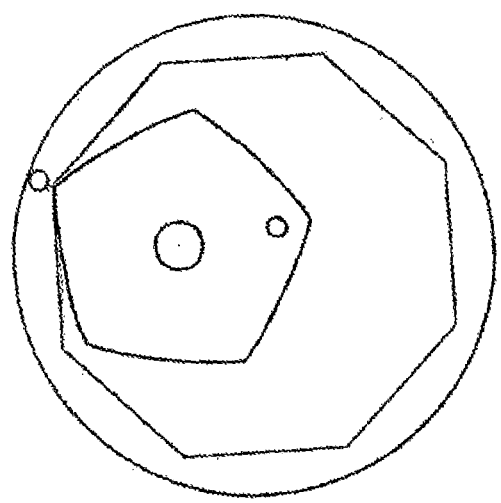
Figure 14:
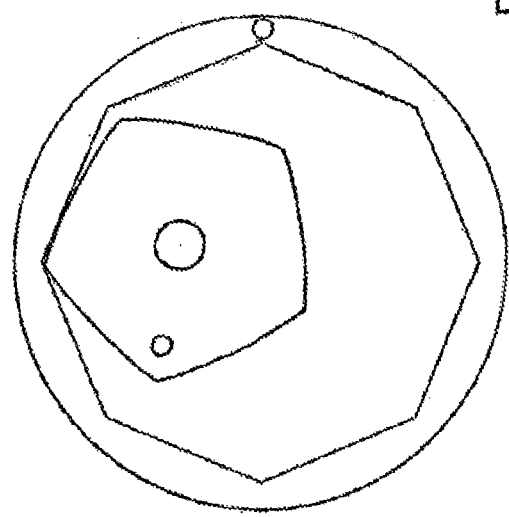

In this embodiment, the wheel will rotate a little more than 1½ rotation when the rim has rotated one rotation; to be exact the ratio will be 5:8. FIG. 15 shows the situation just before this has occurred.

Due to the more obtuse angle between the sides of the wheel, the tipping about the corners takes shorter time than in the first, quadrilateral embodiment of the wheel. The more obtuse (i.e. larger) the angle between the sides of the wheel is the shorter the time it will take between one the wheel side being in contact with a rim side until the next wheel side is in contact with the next rim side.

The angle between the sides will largely depend on the number of sides. The greater number of the sides are, the more obtuse the angle will be. This will result in a smoother running of the transmission and reduce the need for the sides to be curved.

Figure 17:
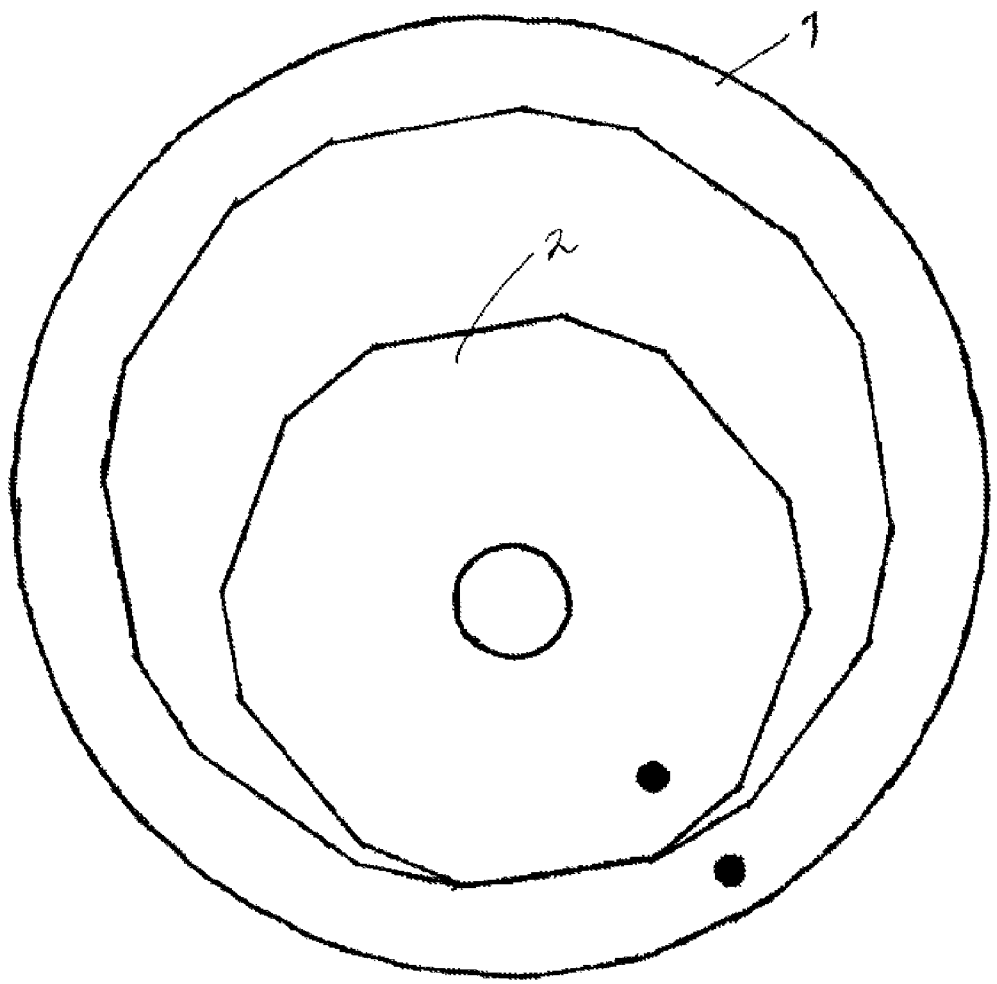
FIG. 17 shows the principles of the invention in a fourth embodiment of the invention in cross-section.

FIG. 17 shows an embodiment where the wheel 2 is a dodecagon (twelve-sided) and the rim inside is a hexadecagon (sixteen-sided). This means that the transmission ratio will be 12:16 or alternatively expressed as 3:4.

With this large number of sides, smooth running can be ensured even with planar sides both on the wheel and the rim.

As can be seen from FIG. 17, the polygons of this embodiment do not have equal sides, as they have alternating long and short sides. This technique can be applied in general irrespective of the number of sides, as long as the shorter sides of the wheel always will meet a short side of the rim and the longer sides of the wheel always will meet a longer side of the rim when the transmission is operating.

In principle all polygons that can be circumscribed by a circle, often called cyclic or concyclic polygons, can be used as the shape of the wheel and the rim, except for triangles, which have corners that are too acute and therefore vulnerable. However, the wheel and the rim have to be matched so that the sides that meet one-another during rotation are of equal length.

Figure 16:
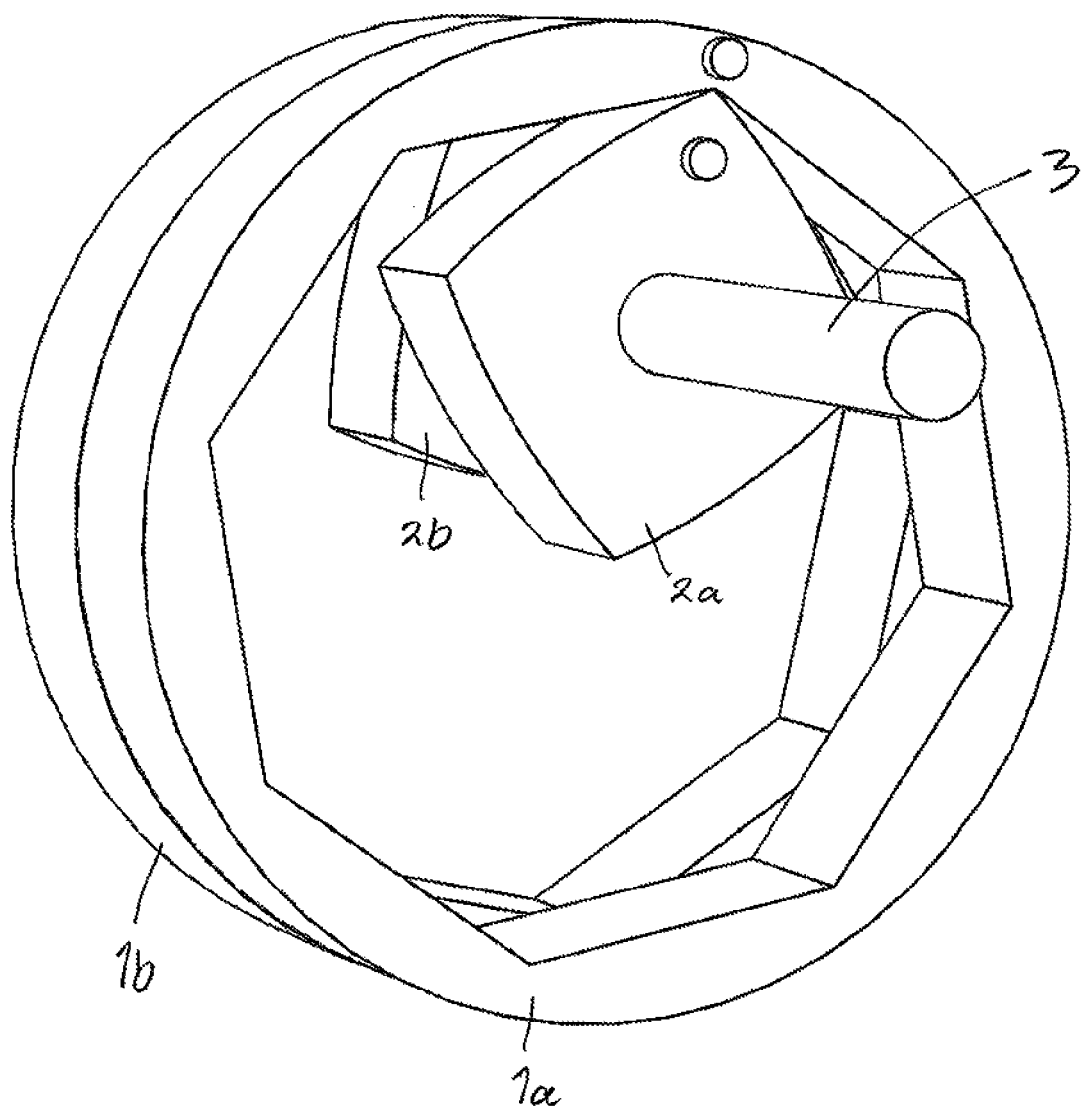
FIG. 16 shows the principles of the invention in a third embodiment in a schematic isometric view.

FIG. 16 shows an embodiment of the invention in isometric view. This embodiment is based on the embodiment of FIG. 1 but has two wheels 2a and 2b and two rims 1a and 1b. The wheels 2a, 2b are arranged next to one-another on the same shaft 3 but are displaced angularly by 45 degrees.

The rims 1a, 1b are also arranged next to one-another with a common rotation axis but are also displaced angularly by 45 degrees. Consequently, the wheel 2a will be in contact with the rim 1a and the wheel 2b will be in contact with the rim 1b during rotation.

Such a construction will result in a smoother running of the transmission and the ability to transfer greater torque. By adding further wheels and rims, the maximum torque of the transmission can be further increased.

If the wheel has a low number of sided, such as the quadrilateral wheel described above in connection with FIGS. 1-9, there may be a risk of the wheel slipping on the rim side when there is no contact between the corners, especially if the sides of the wheel are curved with a relatively small radius. The curvature should therefore be relatively small, i.e. a large radius, such as a curvature radius of at least 10 times the diameter of the wheel. FIGS. 1-9 exaggerates this curvature.

The slipping risk will be effectively prevented in the embodiment of FIG. 16, as the corners of the two wheels will alternate in being in contact with the corners of the rim.

The transmission of the invention can easily function as a coupling. If the sides of the wheel and the rim are of equal length, the shaft of the wheel, or alternatively the shaft of the rim, can be arranged displaceable transverse to the axis, and the wheel can be brought out of contact with the rim so that the two parts are allowed to rotate freely from one-another. When the transmission is to be coupled in again, the shaft can be shifted back. Since there are no teeth that can be damaged, this can be done while the parts are rotating and at a moderate torque.

A multispeed transmission can be realized by having different wheels, i.e. different polygons, that can be brought into contact with the rim depending on the desired speed. The wheels can be arranged on different shafts or one after the other on a single shaft, which can be displaced both in the longitudinal direction and transverse to the longitudinal direction.

The invention claimed is:

1. A transmission comprising:
   a rim;
   a wheel;
   an outside surface of the wheel being adapted to engage with an inside surface of the rim;
   the wheel being rotatable about a first axis and the rim being rotatable about a second axis;
   one of the wheel and the rim being an input element of the transmission and the other of the wheel and the rim being an output element of the transmission;
   the wheel and the rim being mounted so that the second axis is at a distance from the first axis;
   wherein the inside surface of the rim has a cyclic polygonal shape comprising first sides, with an angle between each adjoining first side of the cyclic polygonal shape being greater than 90°;
   wherein an outer surface of the wheel has a cyclic polygonal shape comprising second sides, with an angle between each adjoining second side of the polygon being greater than 90°; and wherein each second side of the wheel engages with a first side of the rim of equal length during rotation of the transmission.

2. The transmission of claim 1, wherein the second sides of the wheel are planar.

3. The transmission of claim 1, wherein the second sides of the wheel have a curvature with a radius greater than 10 times the diameter of the wheel.

4. The transmission of claim 3, wherein the curvature is convex.

5. The transmission of claim 1, wherein the first sides of the rim are planar.

6. The transmission of claim 1, comprising:

a second wheel;

wherein the wheel and the second wheel are arranged on a common shaft;

wherein the wheel and the second wheel have an angular displacement relative to each other;

a second rim; and wherein one of the rim and the second rim engages each of the wheel and the second wheel; and wherein the rim and the second rim have the same angular displacement relative to each other as the wheel and the second wheel.

7. The transmission of claim 1, wherein the wheel is displaceable transverse to the first axis in order to disengage from the rim.

8. The transmission of claim 1, comprising:

a second wheel;

wherein the wheel and the second wheel have different number of second sides;

wherein the wheel and the second wheel are selectively engageable with the rim to change a ratio of the transmission depending on which of the wheel and the second wheel is in engagement with the rim.

* * * * *